United States Patent
Wing

[15] 3,671,695
[45] June 20, 1972

[54] BRAKE FLUID LEVEL SENSOR

[72] Inventor: Douglas J. Wing, St. Clair Shores, Mich.

[73] Assignee: General Motors Corporation, Detroit, Mich.

[22] Filed: April 24, 1970

[21] Appl. No.: 31,678

[52] U.S. Cl. .........................................200/84 R, 200/67 DA
[51] Int. Cl. .........................................................H01h 35/18
[58] Field of Search..................200/67 DA, 67 DB; 74/100 P

[56] References Cited

UNITED STATES PATENTS

| | | | |
|---|---|---|---|
| 2,395,698 | 2/1946 | Tiffany | 200/67 DB UX |
| 2,524,408 | 10/1950 | Trainor | 200/67 DA UX |

FOREIGN PATENTS OR APPLICATIONS 809,287   4/1969   Canada.......................200/67 DA UX Primary Examiner—David Smith, Jr.
Attorney—J. L. Carpenter and Paul Fitzpatrick

[57] ABSTRACT

A switch for use in a low fluid surface level warning system. A sealed diaphragm follows the varying fluid surface level. A string-like pull member whose one end is fixed to the diaphragm has its other end fixed to the free end of a leaf spring member of concavo-convex cross-section and of greater rigidity near its fixed end than its free end. Near the free end of the leaf spring member is an electrically conducting tongue extending toward the fixed end. As the liquid surface falls the string-like pull member forces the leaf spring member to bend near its free end until it snaps through and projects the tongue against another contact to complete an actuating circuit for a warning device.

1 Claim, 3 Drawing Figures

PATENTED JUN 20 1972 3,671,695
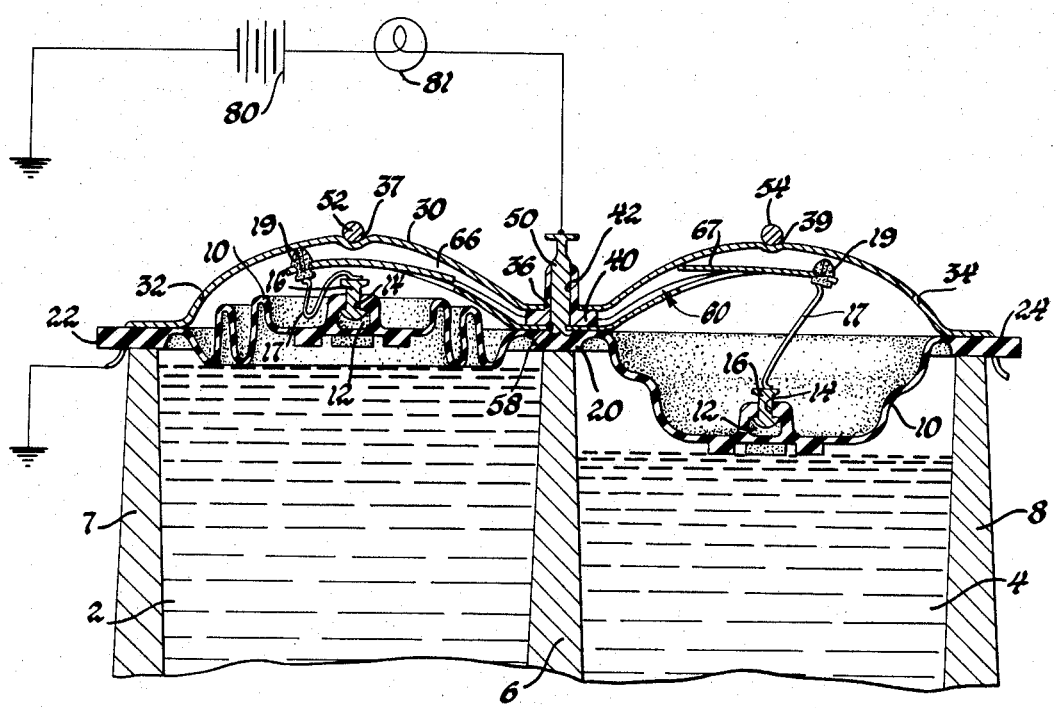
Fig.1
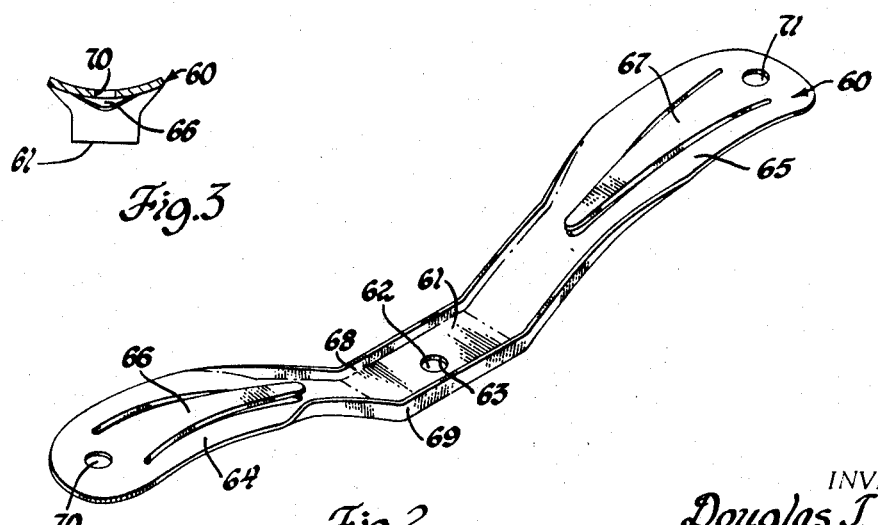
Fig.3
Fig.2
INVENTOR.
Douglas J. Wing
BY
Paul Fitzpatrick
ATTORNEY

BRAKE FLUID LEVEL SENSOR

This invention relates to a system providing an indication of an abnormally low level of brake fluid in a reservoir, such as that in the master cylinder assembly of a vehicle brake system.

In particular, this invention comprises a new switch mechanism for use with a sealed diaphragm which follows the variations in the surface level of the brake fluid in the master cylinder. The switch mechanism completes a circuit including a voltage source such as the vehicle battery and an indicating device such as a warning lamp to alert the vehicle operator that a specified low brake fluid level exists.

The embodiment of the switch mechanism herein described can be used in a double master brake cylinder such as that described in my U.S. Pat. No. 3,368,046; but the invention is easily applicable to almost any reservoir. The snap action of the switch provides positive bias for the contacts when the fluid surface reaches the predetermined level and prevents spurious signals. The switch contacts are isolated from the brake fluid to prevent any voltage gradients from affecting the fluid.

It is an object of this invention to provide a new and useful brake fluid level switch with snap action for positive engagement of contacts.

It is a further object to provide a brake fluid level switch whose electrically conducting members are electrically insulated from the brake fluid.

Further objects of this invention will be apparent from the following description, reference being made to the accompanying drawing of a preferred embodiment of the invention.

In the drawings:

FIG. 1 is a cross-sectional side elevation view of the switch in the brake cylinder.

FIG. 2 is a perspective view of the moving contacts of the switch and their supporting member.

FIG. 3 is an end view of the end of supporting member of FIG. 2, showing the member's curvature.

Referring now to FIG. 1, separate master cylinder reservoirs 2 and 4 defined by walls 6, 7 and 8 of the master cylinder housing contain brake fluid.

In each reservoir a flexible rubber diaphragm 10 covers the liquid. A peripheral seal is formed between thicker portions 20 22 and 24 of the diaphragm 10 and the reservoir walls 6, 7 and 8 so that the diaphragm rises and falls with the liquid surface level.

A dual reservoir cap 30 made of metal and providing vent ports 32 and 34 supports a flanged insulator bushing 40 in a centrally disposed aperture 36 which aligns with the central wall 6 of the master cylinder housing. The insulator bushing 40 supports an electrically conductive terminal member 50 in a centrally disposed aperture 42. The terminal member, at its lower end, is affixed to and is in electrical contact with a leaf spring member 60, the center of which is aligned with the center of central wall 6 and the ends of which project into the cavities between the reservoir cap 30 and diaphragm 10 in each reservoir. The upper end of the terminal member 50 projects upward out of the insulator bushing aperture 42 to form a terminal for outside electrical connection. The dual reservoir cap 30 is held in place by bails 52 and 54 which fit into recesses 37 and 39 in the cap 30 and are affixed to the housing by conventional means not shown. The bails 52 and 54 are tensioned to provide a constant bias downward toward the housing walls 6, 7 and 8 and thus hold the reservoir cap 30, insulator bushing 40, leaf spring member 60, terminal member 50, and diaphragm sealing portion 20 rigidly in place against the housing wall 6. Likewise, the diaphragm sealing portions 22 and 24 are held rigidly against housing walls 7 and 8.

The leaf spring member, as shown in FIG. 2, has a flat middle plate 61 containing a centrally located aperture 62 through which the lower end of the terminal member 50 projects. The circular inside edge 63 of the middle plate aperture 62 is rigidly held in a circumferential notch 58 in the terminal member 50. From opposite sides of the flat middle plate 61 of the leaf spring member extend long curved flexible leaf springs 64 and 65, which are curved in cross section near the free end, as seen in FIG. 3.

Each leaf spring is cut in such a way that tongues 66 and 67 are formed, each tongue having a fixed end where it joins the main body of the leaf spring near the leaf spring's free end and a free end extending toward the flat middle plate. The side edges 68 and 69 of the leaf spring member 60 are crimped upwards at a 90° angle over the full length of the flat middle plate 61 and part of the length of each leaf spring 66 and 67 to decrease the flexibility of the middle portion of the leaf spring member 60. Finally, near the free end of the leaf springs 64 and 65 are apertures 70 and 71.

Referring again to FIG. 1, in the diaphragm 10 near the center of each reservoir, is located a hollow cavity 12 accessible from the vented side by an aperture 14. In each aperture 14 is inserted a rivet-like plug 16 to which is attached one end of a string-like flexible pull line 17. The other end of of each pull line is attached to a second rivet-like plug 19, made of insulating material, one of which is inserted in aperture 70 and one in aperture 71 of the leaf spring member 60.

Included in the system is an electrical circuit comprising a battery 80, warning light 81, terminal member 50, leaf spring member 60, reservoir cap 30, and the vehicle ground. The circuit conducts only when either of tongues 66 or 67 of the leaf spring member 60 makes contact with the reservoir cap 30.

In operation, when brake fluid level in the reservoir is adequately high, the state of the switch is as seen in the left-hand reservoir 2 of FIG. 1. The diaphragm 10 is high, the pull line 17 is slack and plug 19 prevents the leaf spring member 60 from making contact with the reservoir cap 30. As brake fluid surface level begins to fall, gravity and atmospheric air pressure force the diaphragm 10 to fall with it. When a point is reached at which the pull line becomes taut plug 19 is pulled away from the reservoir cap and the free end of the leaf spring member 60 is bent downwards toward the diaphragm 10. Because of its crimped side edges 68 and 69 the leaf spring member 60 tends to bend the most in the range closest to the free end where the side edges are not crimped. This produces a rotation of the projecting tongue 66 around an axis quite near its fixed end, so that its free end begins to move upward toward the reservoir cap 30. The cross-sectional curvature of the leaf spring member 60 near its free end gives it a range of bending with a negative spring constant. As the brake fluid surface level continues to fall and the pull line 17 continues to bend the leaf spring member 60, that range is reached just as the brake fluid surface level reaches the predetermined critical level. At that point the leaf spring member 60 snaps through and projects the free end of the tongue 67 into positively biased contact with the reservoir cover 30 as shown in the right-hand reservoir 4 of FIG. 1. This completes the electrical circuit and lights the warning lamp 81 to alert the vehicle operator of the condition.

It will be apparent that my improved switch may be employed in various environments. The detailed description of the preferred embodiment of the invention is not to be construed in a limiting sense, as many modifications of structure may be made by the exercise of skill in the art.

I claim:

1. A switch for completing a current path through a circuit that includes a power source and an indicator device when fluid in a reservoir falls below a certain level comprising, in combination, a support; a fixed contact mounted on said support and connected in series with said circuit; a leaf spring that is connected in series with said circuit and has an end fixed to the support and a free end; and means mechanically coupled to the free end and responsive to the fluid level, the leaf spring having a tongue secured to its free end so as to extend substantially toward its fixed end, the leaf spring being curved in cross section and having at least one side crimped near the fixed end whereby the rigidity of the leaf spring is greater near the fixed end than at the free end, loading forces applied to the free end of the spring due to the fluid falling below the certain level thereby flexing the spring with a snap action due to the curved cross section so as to extend the tongue into electrical engagement with the fixed contact to complete the current path so long as the fluid level remains below the certain level.

* * * * *